3,450,760
PROCESS FOR PRODUCTION OF ANHYDROUS
ALKYL AND CYCLOALKYL AMINES
Leonard William Hoffman, Southgate, and Roland
Maurice Guertin, Rockwood, Mich., assignors to
Pennsalt Chemicals Corporation, Philadelphia, Pa.,
a corporation of Pennsylvania
Filed Aug. 30, 1965, Ser. No. 483,534
Int. Cl. C07c 85/02, 87/36, 87/04
U.S. Cl. 260—563                                    13 Claims

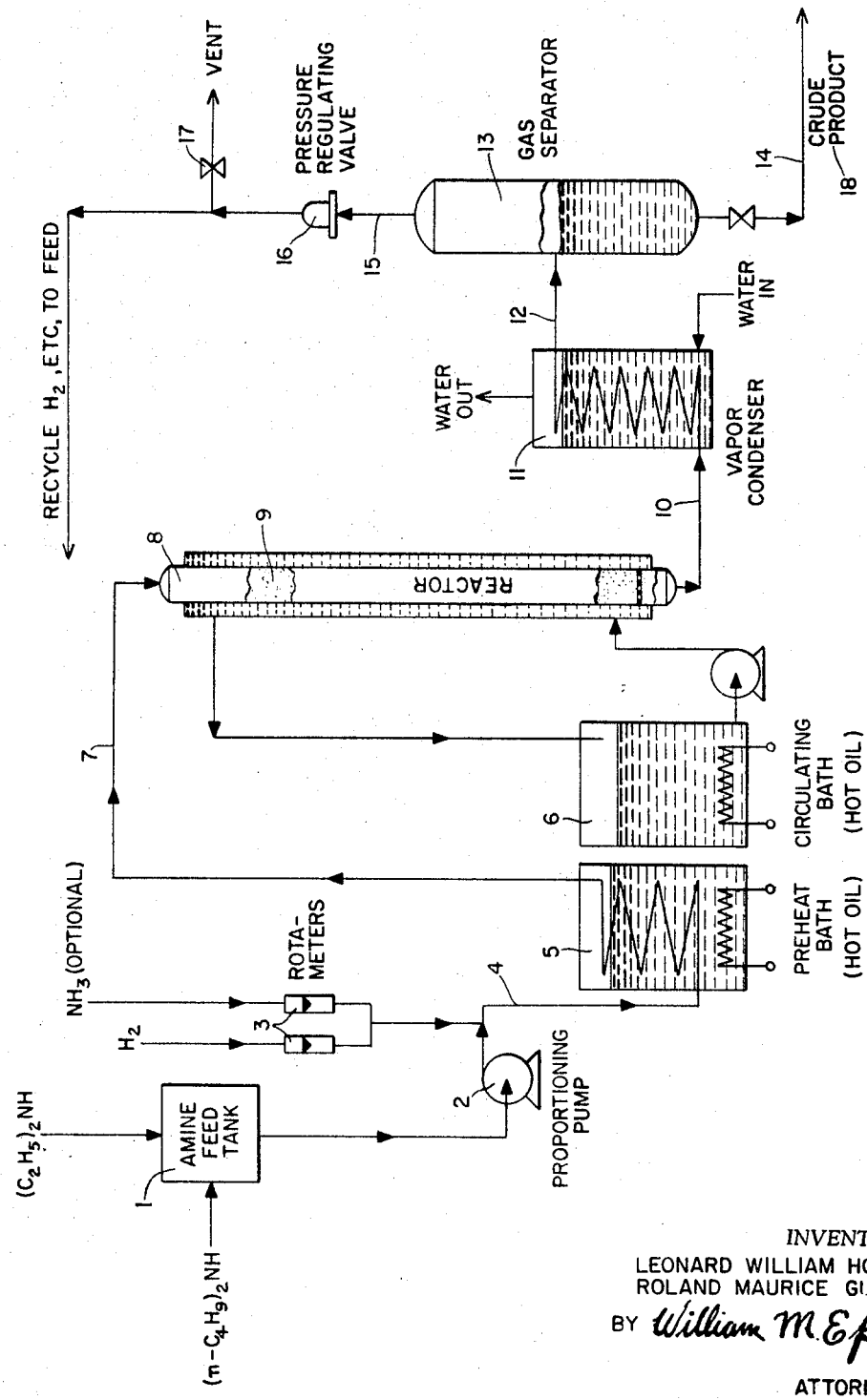

ABSTRACT OF THE DISCLOSURE

Process for production of anhydrous alkyl and cycloalkyl amines by reacting a mixture of alkyl amines containing two different alkyl groups in the vapor phase at a space velocity of about 200 to 4000 at a temperature of about 125° to about 325° C. at superatmospheric pressure in the presence of hydrogen and a hydrogenation catalyst, recovering the alkyl amine containing two different alkyl groups from the reaction products mass in substantially anhydrous form, and recycling all or part of the remainder of the reaction mass through the reaction system.

---

This invention relates to a process for the catalytic synthesis of heterolkylamines under anhydrous conditions. Particularly, it relates to the process for the conversion of a mixed alkylamine feed, i.e. one containing at least two different alkylamines to a mixture containing heterodi- and heterotrialkylamines and mono-, di-, and trialkylamines in substantially all the possible combinations based on the different alkyl groups present.

More particularly, it relates to a process for conversion of a mixture of simple alkylamines (i.e. alkylamines in which all alkyl groups attached to the same nitrogen atom are identical) to a mixture of simple alkylamines and heteroalkylamines. The term heteroalkylamine as used in this invention defines an alkylamine in which all alkyl groups attached to the nitrogen atom are not identical and is intended to include both heterodialkylamines and heterotrialkylamines. Examples of such heteroalkylamines are N-ethyl-n-butylamine, N,N-diethyl - n - butylamine, N-ethyl-di-n-butylamine, N-methylisopropylamine, and the like, as more specifically described herein.

Still more particularly the invention relates to a process for reacting a mixture of simple alkylamines in which two and only two different alkyl groups are present to form heteroalkylamines.

The heteroalkylamines are currently of commercial importance especially as chemical intermediates in such fields as synthesis of compounds for agricultural and pharmaceutical purposes.

The significance of the present invention can be better understood by reference to the processes used in preparation of simple alkylamines and the problems arising therein. The conventional production of simple alkylamines is typified by the reaction of the corresponding alcohol with ammonia over a dehydrating or hydrogenating catalyst, or by the reaction of an aldehyde or ketone with ammonia and hydrogen over a hydrogenation catalyst. The crude product from such operations contains the three possible alkylamines (mono-, di- and trialkylamine), together with water of reaction and unconverted reactants. Recovery of these individual amines in relatively pure and anhydrous form from such product mixtures has presented many difficulties in manufacturing operations. See, for example, Gillette and Martin, U.S. Patent 2,998,357, "Recovery of Alkylamines," and the series of patents discussed therein. The usual methods of separation have been based on fractional distillation steps often complicated by the presence of azeotropes of some of the products and by-products.

While it is possible to prepare heteroalkylamines by the above conventional methods, for example, by reacting a mixture of alcohols or an alcohol and an amine of differing alkyl groups, the arising separation problem is so seriously aggravated by the increased number of components and azeotropes produced that such methods have proved unfeasible. Heteroalkylamines accordingly have been prepared heretofore by a variety of classical reactions which in general are conducted batchwise at relatively high cost. For example, N-ethylbutylamine previously has been produced on a semi-commercial scale by the reaction of butyraldehyde with ethylamine to form N-butylidene ethylamine which is then hydrogenated in an autoclave using a precious metal catalyst, and the N-ethylbutylamine thus obtained in a separable form.

We have now discovered an improved process for manufacturing heteroalkylamines in substantially anhydrous form which permits recovering them by conventional industrial distillation process means and avoiding the formation of azeotropes.

In practice of our invention, a starting feed consisting essentially of a mixture of simple alkylamines containing the two different alkyl groups which are desired in the heteroalkylamine product is reacted in the presence of a hydrogenation catalyst and an advantageous amount of hydrogen in the vapor phase at a temperature in the range from about 125° to about 325° C. at superatmospheric pressure. Heterodi- and heterotrialkylamines containing the alkyl groups present in the feed are formed, along with simple alkylamine by-products. The crude product mixture contains as much as 56% or more by weight of total heteroalkylamines.

The individual simple alkylamine used in practicing the invention can be any normal, secondary or tertiary, mono-, di-, or trialkylamine having from one to six carbon atoms in each alkyl group which can be maintained in a vapor state under the temperature and pressure conditions used in the practice of the invention. A combination of individual simple alkylamines which together form volatile heteroalkylamines is used. Preferred combinations of two or more of said simple alkylamines suitable as feed stock in practice of the invention are those which contain two different alkyl groups of which one is methyl or ethyl. The ratio of one kind of alkyl group to the other alkyl group can vary considerably, but the ratio should be such that formation of a substantial proportion of the desired heteroalkylamine occurs. For example, in preparation of a desired heterodialkylamine, e.g. N-ethyl-sec-butylamine, it is generally advantageous to use a feed stock in which the mole ratio of the two different alkyl groups, ethyl and sec-butyl, is approximately 1:1. On the other hand, if it is desired to produce a heterotrialkylamine, e.g. N,N-diethyl-n-butylamine, it is advantageous to use a feed stock in which the mole ratio of ethyl to n-butyl groups is about 2:1. However, considerable deviation from the 1:1 ratio of the two alkyl groups can be employed and in some instances, such as when the two groups differ appreciably in chemical activity, it will be desirable to use a higher ratio, e.g. as high as 4:1, of the less active alkyl group to the more active group. In any case, we do not wish to be limited to a particular ratio of alkyl groups, it being necessary only that each desired alkyl group is present in sufficient proportion to permit formation of the desired heteroalkylamine product in substantial quantity.

Especially preferred simple alkylamines are monoethylamine, dimethylamine, trimethylamine, monoethylamine, diethylamine, triethylamine, mono-n-propylamine, di-n-propylamine, tri-n-propylamine, monoisopropylamine, diisopropylamine, mono-n-butylamine, di-n-butylamine, tri-n-butylamine, mono-sec-butylamine, di-sec-butylamine, mono-tert-butylamine, di-tert-butylamine, monoisobutylamine, diisobutylamine, triisobutylamine, cyclohexylamine, and dicyclohexylamine.

The corresponding preferred heteroalkylamine compounds which can be prepared from the above preferred simple alkylamines by the process of the invention include:

N-methylethylamine
N-methyldiethylamine
N,N-dimethylethylamine
N-methl-n-propylamine
N-methyldi-n-propylamine
N,N-dimethyl-n-propylamine
N-methylisopropylamine
N,N-dimethylisopropylamine
N-methyl-n-butylamine
N-methyldi-n-butylamine
N,N-dimethyl-n-butylamine
N-methyl-sec-butylamine
N-methyldi-sec-butylamine
N,N-dimethyl-sec-butylamine
N-methyl-tert-butylamine
N,N-dimethyl-tert-butylamine
N-methylisobutylamine
N-methyldiisobutylamine
N,N-dimethylisobutylamine
N-methylcyclohexylamine
N,N-dimethylcyclohexylamine
N-ethyl-n-propylamine
N-ethyldi-n-propylamine
N,N-diethyl-n-propylamine
N-ethylisopropylamine
N,N-diethylisopropylamine
N-ethyl-n-butylamine
N-ethyldi-n-butylamine
N,N-diethyl-n-butylamine
N-ethyl-sec-butylamine
N-ethyldi-sec-butylamine
N,N-diethyl-sec-butylamine
N-ethyl-tert-butylamine
N,N-diethyl-tert-butylamine
N-ethylisobutylamine
N-ethyldiisobutylamine
N,N-diethylisobutylamine
N-ethylcyclohexylamine
N,N-diethylcyclohexylamine A further feature of the invention is that any heteroalkylamines present in the crude product mixture which are not desired as a recoverable end product can be recycled, either alone or mixed with the feed simple alkylamines, and converted to the desired heteroalkylamine. In such case, particularly when a heterotrialkylamine is involved, ammonia is desirably added to supply additional nitrogen atoms. Thus, in the overall operation, substantially all the simple alkylamines used ultimately can be converted to the desired heteroalkylamine.

The catalyst used is a hydrogenation catalyst of the type well-known in the art and readily available from commercial catalyst suppliers. Metallic nickel or cobalt catalysts deposited on a supporting material, such as kieselguhr or carbon pellets, and then activated, are preferred. Nickel hydrogenation catalyst deposited on kieselguhr and activated by heating to about 190° C. and passing hydrogen gas over the mass for about 16 hours is especially preferred as the catalyst.

Pressure is not critical to the reaction. However, to increase output of the products and to facilitate fractional distillation of difficultly condensible components, a superatmospheric pressure is advantageous and preferably is used. The pressure is provided partly by the vapor pressure of the volatile components of the reaction mass but primarily by hydrogen. For the reasons stated, we prefer to operate at pressures in the range of about 100 to 300 p.s.i.g., most preferably about 200 p.s.i.g., however, considerably higher or lower pressures can be used without detriment to the reaction.

The reaction is carried out by passing the reactant alkylamines at an advantageous space velocity through a column reactor packed with catalyst in the manner known in the art. The space velocity of reactants through the reactor is defined as the volume of gaseous feed materials at standard conditions of temperature and pressure fed per hour through the reactor per volume of catalyst, e.g. total liters of alkylamines, calculated as gases under standard conditions, fed per hour per liter of catalyst bed equals space velocity. The space velocity will range from about 200 to about 4000. A space velocity of 1000 to 3000 is preferably used.

It is well known that in the rearrangement of simple alkylamines ammonia is normally formed to some extent as a by-product, and that additional ammonia is advantageously used only when the by-product ammonia is insufficient to give the distribution of products desired. Although introduction of ammonia in the practice of the present invention is not ordinarily necessary, and in fact is detrimental when using feed stocks of relatively high nitrogen content, we have found it advantageous to introduce some anhydrous ammonia gas with feed mixtures of relatively low nitrogen content to promote the formation of the desired heteroalkylamine.

The amount of ammonia to use can be readily determined from the ratio of alkyl groups to nitrogen atoms required in the product mix as compared to the ratio of the same in the feed mixture. For example, when the feed mixture is high in simple trialkylamine or heteroalkylamine, more ammonia is required and preferably is used to form the desired heterodialkylamine product. When ammonia is used, the mole ratio of alkylamine or heteroalkylamine to ammonia will range from about 1:0.5 to about 1:2, with a ratio of 1:1 usually being preferred.

Hydrogen is used in the process to provide advantageous superatmospheric pressures, as discussed above. Additionally, hydrogen serves to preserve and prolong the life of the catalyst. The amount of hydrogen used will vary somewhat in accordance with the volatility of the simple alkylamines being used. The mole ratio of alkylamine to hydrogen usually will range from about 1:0.05 to about 1:20 with a ratio of 1:2 being preferred.

The process can be further understood by reference to the drawing which illustrates a preferred embodiment of the process of the invention. As shown in the drawing, diethylamine and di-n-butylamine are fed to a tank 1, where they are mixed in 1:1 mole ratio. From tank 1 they are fed continuously to a proportioning pump 2. Hydrogen gas, in a 10:1 mole ratio to the alkylamines and, if desired, ammonia gas, is fed through a rotometer 3 into a charge line 4 where it mixes with the alkylamine feed from pump 2. The mixture is preheated in an electrically heated bath 5 to a reaction temperature, preferably to about 150–200° C. An auxiliary circulating bath of hot oil, preferably electrically heated, is used to maintain the reactor contents at the above desired operating temperature. The preheated feed mixture enters the top of the reactor column 8 through line 7. The column is packed with activated nickel catalyst 9. The reaction mass leaves the column 8 through line 10 and enters a vapor condenser 11. The condensate and noncondensible gases from the condenser 11 pass through line 12 into gas separator 13. The liquid crude product 18 is removed from the reactor system through line 14 and goes to storage or directly to a conventional fractionation still column, not shown. The unreacted gaseous products are recycled through line 15 through pressure regulating valve 16 back to the hydrogen and ammonia feed rotometers 3. A vent line 17 is provided for occasional purging of inert gases. The crude product consists of a mixture of monoethylamine, diethylamine, mono-n-butylamine, di-n-butylamine, N-ethyl-n-butylamine, N-ethyldi-n-butylamine, N,N-diethyl-n-butylamine, triethylamine, tri-n-butylamine and a trace of ammonia. The N-ethyl-n-butylamine, N-ethyl-di-n-butylamine, and N,N-diethyl-n-butylamine total about 55% by weight of the crude product, with the desired N-ethyl-n-butylamine amounting to about 25-30% by weight of the crude product.

Separation and recovery of the desired heterodialkylamine is carried out continuously in a series of fractionating columns such as are well-known in the art or, alternatively, batchwise in a single column. The various fractions recovered from the distillation step in addition to the specifically desired product, N-ethyl-n-butylamine, can be recovered in purified form if desired, or can be recovered in crude form by taking cuts boiling below and above the the boiling range of the desired product. The purified by-products have commercial use as intermediates and can be sold for such use. Alternatively, the by-products whether in purified or crude form can be recycled back to the reactor system with or without the sinple alkylamine feed through feed tank 1.

The process is carried out continuously and can be carried on for the life of the catalyst.

The invention and its practice are further illustrated by the following examples, in which the percentages are by weight unless otherwise stated.

Example 1.—Apparatus

A 4' steel tube, approximately 1" in inner diameter, equipped with a steel jacket for temperature control and having a ⅛" centralized tube containing thermocouples is packed with 400 ml. of pelleted nickel hydrogenation catalyst as received from a commercial source. The catalyst is activated with hydrogen at about 190°–200° C. for about 16 hours.

Liquid amines feed is pumped at a controlled rate by a proportioning pump having an adjustable piston stroke into a pre-heater coil immersed in a heat exchange fluid maintained at the desired temperature by means of thermostatically controlled immersion heaters. Hydrogen alone, or hydrogen and ammonia, in gaseous form, at pressures somewhat higher than that of the reaction system, are introduced at carefully controlled rates through flow meters into the same preheater coil through which the amines are fed.

From the preheater, the feed mixture, largely or entirely in vapor form, is introduced into the top of the reactor tube. Temperature throughout the reactor is controlled by circulation of a temperature-stable heat exchange fluid from a heated reservoir through the reactor jacket by means of a centrifugal pump. From the bottom or discharge end of the reactor, the converted reaction mixture passes through a water-cooled coil into a steel gas-separating chamber of approximately 4 liters capacity. Uncondensed gas, predominately hydrogen, is continuously vented from the top of the chamber through an automatically controlled pressure release valve which is set to maintain pressure throughout the reaction system at a constant pre-selected level.

Example 2.—Preparation of N-ethyl-n-butylamine

Using the apparatus described in Example 1, a series of runs were carried out to prepare N-ethyl-n-butylamine from a mixture of diethylamine and di-n-butylamine. The results of the runs are shown in Table I. As can be seen in the table, the percentage of N-ethyl-n-butylamine formed in runs A–C ranged from 17.8 to 19.5% by weight at a space velocity of 1500 to 2500 and at a mole ratio of hydrogen to simple alkyl amines of 15:1. When ammonia was included in the charge (run D) at a mole ratio of ammonia to amine to hydrogen 1:1:15, the percentage of the desired product N-ethyl-n-butylamine was increased to 29.0%, and the content of N-ethyl-n-di-butylamine was reduced from the 16.9–20.65% of runs A–C to 12.1%. The advantageous effect of the use of ammonia is thus shown to be substantial. The overall conversion to heteroalkylamines in run D as compared to runs A–C is not significantly affected, being in the range of 56.2%, compared to 52.9–56.2%. The successful practice of the process of the invention for the conversion of mixed alkylamines to mixed heteroalkylamines, and particularly to the desired product N-ethyl-n-butylamine, is thus clearly demonstrated.

Example 3.—Preparation of N-ethyl-n-butylamine

A series of runs E–H for preparation of N-ethyl-n-butylamine were carried out in the apparatus of Example 1 using different combinations of starting alkyl- and heteroalkylamines containing ethyl and n-butyl groups, and using an amine to ammonia to hydrogen ratio of 1:1:10. The results are summarized in Table II. The table shows that conversion of the feed materials to N-ethyl-n-butylamine is such that the desired product is substantially 24.2–29.1% by weight of the crude product mixture regardless of the particular combination of feed materials used. Also, as can be seen from run F, varying the mole ratio of alkylamine to alkylamine from 0.5:0.5, as used in runs E, G and H, to 0.75:0.25 as used in F, has some effect on the yield and distribution of the product and by-products. The advantageous use of ammonia in the presence of a feed consisting of $(C_2H_5)_2$N-n-$C_4H_9$ and $(n-C_4H_9)_2NC_2H_5$, i.e. two heteroalkylamines, is shown in run G, where the crude product contains 56.5% total heteroalkylamines.

Example 4.—Preparation of N-ethylisopropylamine

N-ethylisopropylamine was prepared using the apparatus of Example 1. The starting materials used were diethylamine and diisopropylamine. Hydrogen was used in the ratio of 10:1 of hydrogen to amine. Two runs were made in the absence of ammonia. Two runs were made in the presence of ammonia. The results are shown in Table III. In the table, it is shown that the conversion to the desired N-ethylisopropylamine is such that when no ammonia is present as shown in runs L–M this product amounts to 30.5–31.5% by weight of the crude products mixture with 34.5–35.6% total heteroalkylamines formed. It also shows that when ammonia is added to the feed mixture (runs J–K), the crude product mixture changes, the desired product ranging from 28.1–30.0% and total heteroalkylamines 29.5–31.5%, while the triethylamine content drops significantly to 6.0–6.8%.

TABLE I.—SUMMARY OF RUNS FROM DIETHYLAMINE-N-DIBUTYLAMINE FEEDS
[Vapor phase—180 p.s.i.g., 195° C.]

| Run | A | B | C | D |
|---|---|---|---|---|
| Space velocity | 1,500 | 2,500 | 2,000 | 2,000 |
| Feed (mole ratio): | | | | |
|   Diethylamine | 0.5 | 0.5 | 0.6 | 0.6 |
|   Di-n-butylamine | 0.5 | 0.5 | 0.4 | 0.4 |
|   Ammonia | 0.0 | 0.0 | 0.0 | 1.0 |
|   Hydrogen | 15.0 | 15.0 | 15.0 | 15.0 |
| Crude product mixture (percent by weight): | | | | |
|   Ethylamine | 0.3 | 0.4 | 3.9 | 1.8 |
|   Diethylamine | 6.7 | 5.6 | 8.6 | 9.0 |
|   n-Butylamine } * Triethylamine } | 7.0 | 6.8 | 9.4 | 13.0 |
|   N-ethyl-n-butylamine | 18.5 | 17.8 | 19.5 | 29.0 |
|   N,N-diethyl-n-butylamine | 15.7 | 15.0 | 19.8 | 15.1 |
|   Di-n-butylamine | 20.6 | 22.1 | 13.3 | 15.4 |
|   N-ethyldi-n-butylamine | 20.65 | 20.05 | 16.9 | 12.1 |
|   Tri-n-butylamine | 10.6 | 12.3 | 8.6 | 4.5 |
| Total heteroalkylamines (percent by weight) | 54.85 | 52.85 | 56.2 | 56.2 |

*Not separable by vapor chromatography method.

TABLE II.—EFFECT OF FEED COMPOSITION ON PRODUCT COMPOSITION
[180 p.s.i.g., 195° C.]

| Run | E | F | G | H |
|---|---|---|---|---|
| Space velocity | 2,000 | 2,000 | 2,000 | 2,000 |
| Feed (mole ratio): | | | | |
| Ethylamine | 0.5 | | | |
| n-Butylamine | 0.5 | 0.75 | | |
| Diethylamine | | | | 0.5 |
| Di-n-butylamine | | | | 0.5 |
| Triethylamine | | 0.25 | | |
| N,N-diethyl-n-butylamine | | | 0.5 | |
| N-ethyldi-n-butylamine | | | 0.5 | |
| Ammonia | 1 | 1 | 1 | 1 |
| Hydrogen | 10 | 10 | 10 | 10 |
| Crude product mixture (percent by weight): | | | | |
| Ethylamine | 8.3 | 5.9 | 2.2 | 7.4 |
| Diethylamine | 10.7 | 9.9 | 8.7 | 10.7 |
| Triethylamine | 1.6 | 3.5 | 3.9 | 3.0 |
| n-Butylamine | 17.8 | 13.8 | 6.5 | 10.7 |
| N-ethyl-n-butylamine | 27.9 | 29.1 | 24.2 | 27.2 |
| N,N-diethyl-n-butylamine | 6.3 | 8.0 | 15.4 | 9.2 |
| Di-n-butylamine | 17.2 | 17.6 | 16.1 | 17.0 |
| N-ethyldi-n-butylamine | 7.1 | 8.8 | 16.9 | 10.6 |
| Tributylamine | 3.1 | 3.4 | 6.1 | 4.1 |
| Total heteroalkylamines (percent by weight) | 41.3 | 45.9 | 56.5 | 47.0 |

TABLE III.—PREPARATION OF N-ETHYLISOPROPYLAMINE

| Run | J | K | L | M |
|---|---|---|---|---|
| Space velocity | 2,000 | 2,000 | 2,000 | 2,000 |
| Feed (mole ratio): | | | | |
| Diethylamine | 0.5 | 0.5 | 0.5 | 0.5 |
| Diisopropylamine | 0.5 | 0.5 | 0.5 | 0.5 |
| Ammonia | 1.0 | 1.0 | 0.0 | 0.0 |
| Hydrogen | 10.0 | 10.0 | 10.0 | 10.0 |
| Crude product mixture (percent by weight): | | | | |
| Ethylamine | 6.9 | 6.2 | 0.9 | 0.7 |
| Isopropylamine | 21.1 | 21.0 | 5.0 | 5.5 |
| Diethylamine | 15.5 | 16.4 | 12.6 | 10.6 |
| Ethylisopropylamine | 30.0 | 28.1 | 31.5 | 30.5 |
| Diisopropylamine | 19.0 | 20.0 | 32.4 | 34.4 |
| Triethylamine | 6.0 | 6.8 | 13.5 | 14.3 |
| Diethylisopropylamine | 1.5 | 1.5 | 4.1 | 4.0 |
| Total heteroalkylamines (percent by weight) | 31.5 | 29.6 | 35.6 | 34.5 |

Example 5.—Preparation of N,N-dimethylcyclohexylamine

N,N-dimethylcyclohexylamine was prepared using the apparatus of Example 1. Two parts of cyclohexylamine and 3 parts of dimethylamine were fed into the reactor tube along with 20 parts of hydrogen gas at a space velocity of 2000 and reacted at 200 p.s.i.g. at about 150–165° C. The crude product mixture contained 17.5% by weight of N,N-dimethylcyclohexylamine. Also present in the crude product mixture were 9.4% of N-methylcyclohexylamine and 16.3% of dicyclohexylamine. The remainder of the crude mixture was cyclohexylamine. The composition of the crude product mixture was determined by the vapor chromatography method.

Example 6.—Preparation of N-ethylcyclohexylamine (a) Without ammonia: N-ethylcyclohexylamine was prepared using the apparatus of Example 1. 0.33 mole of diethylamine and 0.67 mole of cyclohexylamine were fed into the reactor tube along with 11 moles of hydrogen gas at a space velocity of 2000 and reacted at 200 p.s.i.g. at about 175–180° C. The crude product mixture contained 19.4% by weight of N-ethylcyclohexylamine.

(b) With ammonia: 0.33 mole of diethylamine and 0.67 mole of cyclohexylamine were fed into the reactor tube of the apparatus of Example 1 along with 10 moles of hydrogen gas and 1 mole of ammonia gas at a space velocity of 2000 and reacted at 200 p.s.i.g. at about 175–180° C. The crude product mixture contained 22.6% by weight of N-ethylcyclohexylamine.

Example 7.—Preparation of N-ethylcyclohexylamine-hydrogen varied

Two runs were made to compare the effect of the amount of hydrogen used on the yield of N-ethylcyclohexylamine. A new batch of catalyst was used than that used in Example 6. In each run, 0.33 mole of diethylamine and 0.67 mole of cyclohexylamine were fed into the reactor tube of Example 1 along with 1 mole of ammonia at a space velocity of 2000 and reacted at 175–180° C. at the pressure created by the gases in the reactor. In the first run 10 moles of hydrogen gas were added. In the second run only 3 moles of hydrogen gas were added. The yield of N-ethylcyclohexylamine in the first run was 26.0% by weight, compared to a yield of 10.7% in the second run. The advantageous effect of hydrogen is thus shown to be significant.

Example 8.—Preparation of N-ethylbutylamine

In the apparatus of Example 1 a mixture comprising diethylamine and mono-n-butylamine in the mole ratio 0.5:1.0 was fed at a rate of 8.33 moles per hour together with approximately 0.2 mole of hydrogen per hours at a reactor temperature of 175° C. and a pressure of 5 lbs. per square inch gauge. This feed rate corresponds to a space velocity of 500. The resultant crude product contained 22.2% by weight of N-ethyl-n-butylamine, 11.6% of N,N-diethyl-n-butylamine, and 14.7% of N,N-n-dibutylethylamine together with the various simple ethyl and butylamines.

Example 9.—Preparation of N-ethylbutylamine

The procedure of Example 8 was duplicated in all respects excepting that the mole ratio of hydrogen to the mixture of diethylamine and n-butylamine was increased to 2:1, the pressure to 100 lbs. per square inch guage and the space velocity to 1000. The amount of hetero amines present in the crude reaction product by weight were as follows: N-ethyl-n-butylamine—23.8%, N-diethyl-n-butylamine—12.2%, N,N-n-dibutylethylamine—15.6%. Total recovery of all amines was 93% of theoretical. The 7% loss is attributed primarily to entrainment and vaporization of the more volatile components with the effluent hydrogen.

In each of the above examples no azeotropes were formed and the desired product in each case was recovered in anhydrous form by fracitional distillation from the crude mixture by means of 4' Nichrome Heli-Pak distillation column equivalent to about 50 theoretical plates.

Many different embodiments of this invention can be made without departing from the scope and spirit thereof and it is to be understood that our invention includes all such embodiments and is not to be limited by the above description.

We claim:

1. A process for production of anhydrous alkylamines each of which contains the same alkyl groups in the vapor phase at a space velocity of about 200 to 4000 at a temperature within the range from about 125° to about 325° C. and at a superatmosphic pressure in the presence of hydrogen and an hydrogenation catalyst recovering the alkyl amine containing two different alkyl groups from the reaction products mass in substantially anhydrous form and recycling all or part of the remainder of the reaction mass through the reaction system.

2. The process for producing anhydrous N-ethyl-n-butylamine which comprises continuously reacting a mixture consisting essentially of diethylamine and di-n-butylamine in the vapor phase at a space velocity of about 200 to 4000 at a temperature in the range from about 125° to about 325° C. at a superatmospheric pressure in the presence of hydrogen and an hydrogenation catalyst, recovering N-ethyl-n-butylamine from the reaction products mass in substantially anhydrous form and recycling all or part of the remainder of the reaction mass to the reaction ssytem.

3. The process according to claim 2 wherein the mixture contains ammonia as an added reactant.

4. The process for producing anhydrous N,N-dimethylcyclohexylamine which comprises continuously reacting a mixture consisting essentially of dimethylamine and cyclohexylamine in the vapor phase at a space velocity of about 200 to 4000 at a temperature in the range from about 125° to about 325° C. at a superatmospheric pressure in the presence of hydrogen and an hydrogenation catalyst, recovering N,N-dimethylcyclohexylamine from the reaction product mass in substantially anhydrous form, and recycling all or part of the remainder of the reaction mass to the reaction system.

5. The process for producing anhydrous N-ethylisopropylamine which comprises continuously reacting a mixture consisting essentially of diethylamine and diisopropylamine in the vapor phase at a space velocity of about 200 to 4000 at a temperature in the range from about 125° to about 325° C. at a superatmospheric pressure in the presence of hydrogen and an hydrogenation catalyst, recovering N-ethylisopropylamine from the reaction products mass in substantially anhydrous form and recycling all or part of the remainder of the reaction mass to the reaction system.

6. The process according to claim 5 wherein the mixture contains ammonia as an added reactant.

7. The process for producing anhydrous N-ethylcyclohexylamine which comprises continuously reacting a mixture consisting essentially of ethylamine and cyclohexylamine in the vapor phase at a space velocity of about 200 to 4000 at a temperature in the range from about 125° to about 325° C. at a superatmospheric pressure in the presence of hydrogen and an hydrogenation catalyst, recovering N-ethylcyclohexylamine from the reaction products mass in substantially anhydrous form and recycling all or part of the remainder of the reaction mass to the reaction system.

8. The process according to claim 7 wherein the mixture contains ammonia as an added reactant.

9. The process for producing anhydrous N,N-diethyl-n-butylamine which comprises continuously reacting a mixture consisting essentially of diethylamine and di-n-butylamine in the vapor phase at a space velocity of about 200 to 4000 at a temperature in the range from about 125° to about 325° C. at a superatmospheric pressure in the presence of hydrogen and an hydrogenation catalyst, recovering N,N-diethyl-n-butylamine from the recation products mass in substantially anhydrous form and recycling all or part of the remainder of the recation mass to the reaction system.

10. The process according to claim 9 wherein the mixture contains ammonia as an added reactant.

11. The process for producing an hydrous N-ethyl-n-butylamine which comprises continuously reacting a mixture consisting essentially of N,N-diethyl-n-butylamine and N-ethyldi-n-butylamine in the vapor phase at a space velocity of about 200 to 4000 at a temperature in the range from about 125° to about 325° C. at a superatmospheric pressure in the presence of hydrogen and an hydrogenating catalyst, recovering N-ethyl-n-butylamine from the reaction products mass in substantially anhydrous form and recycling all or part of the remainder of the reaction mass to the reaction system.

12. The process according to claim 11 wherein the mixture contains ammonia as an added reactant.

13. The process for producing anhydrous N-ethyldi-n-butylamine which comprises continuously reacting N,N-diethyl-n-butylamine with N-ethyldi-n-butylamine in the vapor phase at a space velocity of about 200 to 4000 at a temperature in the range from about 125° to 325° C. at a superatmospheric pressure in the presence of hydrogen, ammonia and an hydrogenation catalyst, recovering N-ethyldi-n-butylamine from the reaction products mass in substantially anhydrous form and recycling all or part of the remainder of the reaction mass to the reaction system.

References Cited

UNITED STATES PATENTS 3,234,281   2/1966   Gaydasch et al. _____ 260—563

CHARLES B. PARKER, *Primary Examiner.*

PATRICIA C. IVES, *Assistant Examiner.*

UNITED STATES PATENT OFFICE
CERTIFICATE OF CORRECTION

Patent No. 3,450,760                                June 17, 1969

Leonard William Hoffman et al.

It is certified that error appears in the above identified patent and that said Letters Patent are hereby corrected as shown below:

Column 8, line 48, beginning with "A process for" cancel all to and including "reaction system." in line 57, same column 8, and insert > A process for production of anhydrous alkylamines and cycloalkylamines which comprises continuously reacting a mixture consisting essentially of different alkylamines each of which contains the same alkyl groups in the vapor phase at a space velocity of about 200 to 4000 at a temperature within the range from about 125° to about 325°C. and at a superatmospheric pressure in the presence of hydrogen and an hydrogenation catalyst recovering the alkyl amine containing two different alkyl groups from the reaction products mass in substantially anhydrous form and recycling all or part of the remainder of the reaction mass through the reaction system.

same column 8, line 68, "ssytem" should read -- system --.
Column 10, line 4, "recation" should read -- reaction --.

Signed and sealed this 12th day of May 1970.

(SEAL)
Attest:

EDWARD M. FLETCHER, JR.                            WILLIAM E. SCHUYLER, JR.
Attesting Officer                                     Commissioner of Patents